(12) United States Patent
Xu et al.

(10) Patent No.: US 11,308,993 B2
(45) Date of Patent: Apr. 19, 2022

(54) SHORT VIDEO SYNTHESIS METHOD AND APPARATUS, AND DEVICE AND STORAGE MEDIUM

(71) Applicant: GUANGZHOU HUYA INFORMATION TECHNOLOGY CO., LTD., Guangdong (CN)

(72) Inventors: Zihao Xu, Guangzhou (CN); Xiaodong Wu, Guangzhou (CN)

(73) Assignee: GUANGZHOU HUYA INFORMATION TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/981,772

(22) PCT Filed: May 24, 2019

(86) PCT No.: PCT/CN2019/088349
§ 371 (c)(1),
(2) Date: Sep. 17, 2020

(87) PCT Pub. No.: WO2019/228267
PCT Pub. Date: Dec. 5, 2019

(65) Prior Publication Data
US 2021/0098024 A1    Apr. 1, 2021

(30) Foreign Application Priority Data
May 28, 2018 (CN) .......................... 201810520553.8

(51) Int. Cl.
G11B 27/06    (2006.01)
G06K 9/00    (2022.01)
(Continued)

(52) U.S. Cl.
CPC .......... *G11B 27/06* (2013.01); *G06K 9/00718* (2013.01); *G06K 9/00744* (2013.01); *G06K 9/6256* (2013.01); *G11B 27/031* (2013.01)

(58) Field of Classification Search
CPC .. G11B 27/06; G11B 27/031; G06K 9/00718; G06K 9/00744; G06K 9/6256
See application file for complete search history.

(56) References Cited

U.S. PATENT DOCUMENTS

2009/0103887 A1    4/2009    Choi et al.
2010/0030645 A1*   2/2010    Watanuki ................ G06F 16/70
                                                           705/14.53
(Continued)

FOREIGN PATENT DOCUMENTS

CN    101901619 A    12/2010
CN    102611685 A    7/2012
(Continued)

OTHER PUBLICATIONS

International Search Report dated Aug. 12, 2019 for PCT/CN2019/088349.

*Primary Examiner* — Mishawn N. Hunter
(74) *Attorney, Agent, or Firm* — Schmeiser, Olsen & Watts, LLP

(57) ABSTRACT

Provided are a short video synthesis method and apparatus, a device and a storage medium. The method includes: obtaining a video frame set corresponding to a to-be-processed video, where each video frame in the video frame set carries a timestamp; respectively inputting all video frames in the video frame set into an interest frame identification model to obtain a plurality of to-be-synthesized video frames, where the interest frame identification model is used for identifying a video frame meeting an interest degree condition in the input video frames; and splicing, according to the timestamp carried by the each to-be-
(Continued)

synthesized video frame, the plurality of to-be-synthesized video frames to form a short video corresponding to the to-be-processed video.

18 Claims, 5 Drawing Sheets

(51) Int. Cl.
*G06K 9/62* (2022.01)
*G11B 27/031* (2006.01)

(56) References Cited

U.S. PATENT DOCUMENTS

| | | |
|---|---|---|
| 2015/0356966 A1 | 12/2015 | Yano |
| 2015/0356996 A1 | 12/2015 | Aghdasi et al. |
| 2019/0020901 A1* | 1/2019 | Ananthapur Bache ...................... H04N 19/70 |

FOREIGN PATENT DOCUMENTS

| | | |
|---|---|---|
| CN | 103535023 A | 1/2014 |
| CN | 104093001 A | 10/2014 |
| CN | 104504397 A | 4/2015 |
| CN | 104581407 A | 4/2015 |
| CN | 104995639 B | 10/2015 |
| CN | 105635749 A | 6/2016 |
| CN | 106331479 A | 1/2017 |
| CN | 107995536 A | 5/2018 |
| CN | 108718417 A | 10/2018 |
| CN | 108769723 A | 11/2018 |
| CN | 108769801 A | 11/2018 |

\* cited by examiner

SHORT VIDEO SYNTHESIS METHOD AND APPARATUS, AND DEVICE AND STORAGE MEDIUM

CROSS-REFERENCES TO RELATED APPLICATIONS

This application is a National Stage Application, filed under 35 U.S.C. 371, of International Application No. PCT/CN2019/088349, filed on May 24, 2019, which claims priority to a Chinese patent application No. 201810520553.8 filed with CNIPA on May 28, 2018, the entire contents both of which are incorporated herein by reference in their entireties.

FIELD OF TECHNOLOGY

The following relates to the technical filed of the Internet, and for example, relate to a short video synthesis method and apparatus, a server and a storage medium.

BACKGROUND

With rapid development of network technologies, a mobile live broadcasting technology has become one of current social hotspots. A user can do live broadcasting through live broadcasting software by using a terminal device. Through live broadcasting, the user can introduce a product, share a tourist attraction where the user is currently located, or share a cooking process of a cuisine, and the like. A short video may be made of highlights in a live broadcasting video and is popular with users. The short video made of highlights in a live broadcasting video becomes one of the most popular digital content for users of the mobile Internet. In the related art, in the synthesis of a short video, the short video is obtained by manually watching a video and manually intercepting highlights of the video. However, since a live broadcasting video lasts a longer time, the manner of manual selection not only can easily miss some highlights, but also is costly, time-consuming and extremely inefficient.

SUMMARY

An aspect relates to a short video synthesis method and apparatus, a server and a storage medium.

In a first aspect, the embodiments of the present application provide a short video synthesis method. The method includes steps described below.

A video frame set corresponding to a to-be-processed video is obtained, where each video frame in the video frame set carries a timestamp;

all video frames in the video frame set are respectively input into an interest frame identification model to obtain a plurality of to-be-synthesized video frames, where the interest frame identification model is used for identifying a video frame meeting an interest degree condition in the input video frames;

according to the timestamp carried by the each to-be-synthesized video frame, the plurality of to-be-synthesized video frames is spliced to form a short video corresponding to the to-be-processed video.

In a second aspect, the embodiments of the present application further provide a short video synthesis apparatus. The apparatus includes a video frame set obtaining module, a to-be-synthesized video frame obtaining module, and a short video forming module.

The video frame set obtaining module is configured to obtain a video frame set corresponding to a to-be-processed video, where each video frame in the video frame set carries a timestamp.

The to-be-synthesized video frame obtaining module is configured to respectively input all video frames in the video frame set into an interest frame identification model to obtain a plurality of to-be-synthesized video frames, where the interest frame identification model is used for identifying a video frame meeting an interest degree condition in the input video frames.

The short video forming module is configured to splice, according to the timestamp carried by the each to-be-synthesized video frame, the plurality of to-be-synthesized video frames to form a short video corresponding to the to-be-processed video.

In a third aspect, the embodiments of the present application further provide a computer device. The computer device includes a memory, a processor, and a computer program stored in the memory and executable on the processor. When executing the computer program, the processor implements the short video synthesis method described in the embodiments of the present application.

In a fourth aspect, the embodiments of the present disclosure further provide a computer-readable storage medium. The computer-readable storage medium is configured to store a computer program. When executed by the processor, the computer program implements the short video synthesis method described in the embodiments of the present application.

BRIEF DESCRIPTION

Some of the embodiments will be described in detail, with reference to the following figures, wherein like designations denote like members, wherein.

DETAILED DESCRIPTION

Figure 1:
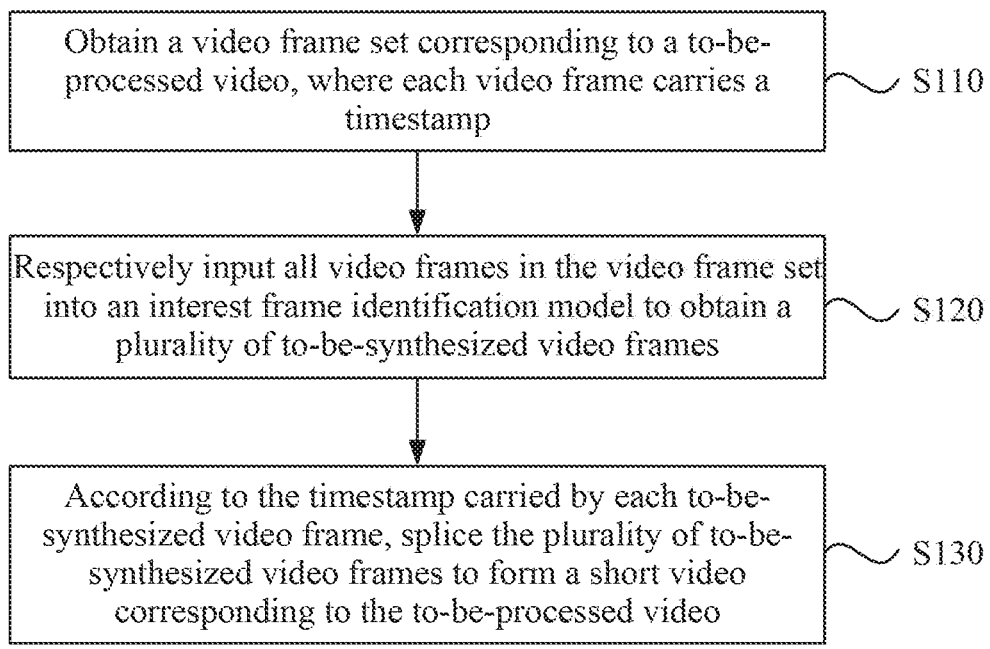
FIG. 1 is a flow chart of a short video synthesis method in embodiment 1 of the present application.

The present application will be described below in conjunction with the drawings and embodiments. It is to be understood that the embodiments set forth below are intended to illustrate and not to limit the present application. It is to be noted that to facilitate description, only part, not all, of structures related to the present application are illustrated in the drawings.

Embodiment 1

FIG. 1 is a flow chart of a short video synthesis method in embodiment 1 of the present application. The present embodiment may be applicable to a case of short video synthesis. The method may be executed by a short video synthesis apparatus. The apparatus may be composed of hardware and/or software, and may be generally integrated in a computer, a server, and all terminals including a short video synthesis function. As shown in FIG. 1, the method includes steps described below.

In step 110, a video frame set corresponding to a to-be-processed video is obtained, where each video frame carries a timestamp.

The to-be-processed video may be a video which is recorded by an anchor and published by a live broadcasting platform, or a video (such as a movie video, a television show video, a variety show video, and the like) which is obtained from editing a recorded video by a professional and then is published on a video platform. The video frame set may be a set composed of all video frames constituting the to-be-processed video, or a set composed of video frames of a set time period in the to-be-processed video. For example, assuming that a time duration of the to-be-processed video is 40 minutes, the set time period may be a time period between the 10th minutes and the 30th minutes. In this embodiment, the video frame set is a set composed of all video frames constituting the to-be-processed video. The timestamp may be a time point of a video frame in the to-be-processed video.

In this embodiment, a manner of obtaining the video frame set corresponding to the to-be-processed video may be to input the to-be-processed video into video processing software, and extract video frames included in the to-be-processed video by using the video processing software to obtain the video frame set corresponding to the to-be-processed video.

In step 120, all video frames in the video frame set are respectively input into an interest frame identification model to obtain a plurality of to-be-synthesized video frames.

The interest frame identification model is used for identifying a video frame meeting an interest degree condition in the input video frame. The interest degree condition may include interest and non-interest. The interest frame identification model may be a model obtained by continuously training a large number of samples marked with an interest degree label based on a set deep learning model.

In an embodiment, an operation principle of the interest frame identification model may be that, when a video frame is input, the interest frame identification model performs image identification on the input video frame, analyzes identified image information, and determines whether the image information included in the input video frame meets an interest degree condition, outputs the video frame if the image information meets the interest degree condition, and discards the video frame if the image information does not meet the interest degree condition. In this embodiment, after the video frames in the video frame set are respectively input to the interest frame identification model, the interest frame identification model respectively performs image identification and image analysis on the video frames in the video frame set, outputs video frames meeting the interest degree condition, and discards video frames not meeting the interest degree condition.

In step 130, according to the timestamp carried by each to-be-synthesized video frame, the plurality of to-be-synthesized video frames is spliced to form a short video corresponding to the to-be-processed video.

In one embodiment, the short video may be a video composed of less than 10,000 video frames. In this embodiment, after a plurality of to-be-synthesized video frames is obtained, the plurality of to-be-synthesized video frames is spliced according to a sequence of all timestamps carried by the video frames, to form a short video which corresponds to the to-be-processed video and meets the interest degree condition. Exemplarily, a video frame set corresponding to a certain to-be-processed video is input into the interest frame identification model to obtain 300 video frames meeting the interest degree condition, and the 300 video frames are spliced according to the sequence of the timestamps to obtain the short video corresponding to the to-be-processed video.

In the present embodiment, firstly a video frame set corresponding to a to-be-processed video is obtained, where each video frame carries a timestamp; then the video frames in the video frame set are respectively input into an interest frame identification model to obtain a plurality of to-be-synthesized video frames, where the interest frame identification model is used for identifying a video frame meeting an interest degree condition in the input video frames; finally the plurality of to-be-synthesized video frames is spliced according to the timestamp to form a short video corresponding to the to-be-processed video. In the related art, the manner of manually selecting highlights to synthesize a short video not only can easily miss some highlights, but also is costly, time-consuming and extremely inefficient. According to the short video synthesis method, the video frame set of the to-be-processed video is input into the interest frame identification model to automatically obtain a plurality of to-be-synthesized video frames meeting the interest degree condition, and there is no need for a large amount of labor to identify the video frames meeting the interest degree condition in the to-be-processed video, thereby improving the efficiency of short video synthesis.

Embodiment 2

Figure 2:
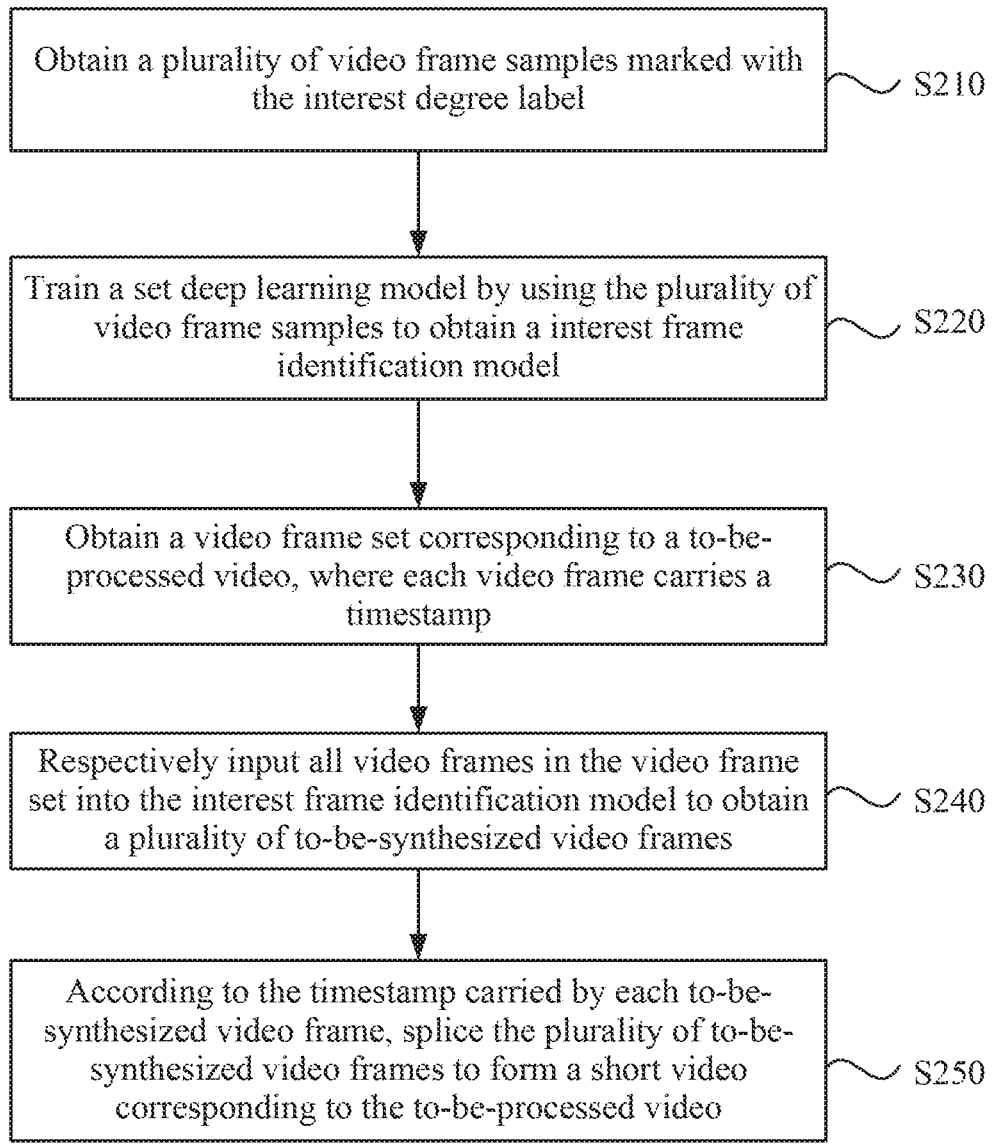
FIG. 2 is a flow chart of a short video synthesis method in embodiment 2 of the present application.

FIG. 2 is a flow chart of a short video synthesis method in embodiment 2 of the present application. Based on the above embodiment, as shown in FIG. 2, the method includes steps described below.

In step 210, a plurality of video frame samples marked with the interest degree label is obtained.

In this embodiment, the interest degree label includes a label of interest and a label of non-interest. The video frames may be extracted from a plurality of live broadcasting videos on a live broadcasting platform, and the video frame samples may be composed of video frames in a large number of live broadcasting videos. In this embodiment, a process of obtaining the plurality of video frame samples marked with the interest degree label may be to search multiple live broadcasting videos in multiple video categories from a live broadcasting platform, then extract multiple video frames from the multiple live broadcasting videos respectively, and mark interest degree labels on the extracted multiple video frames, so as to obtain the video frame samples. In an embodiment, the video categories may include a food category, a competitive game category, a singing category, a travel category, a beauty makeup category, and the like. In an embodiment, a manner of marking the interest degree labels on multiple video frames may be to mark manually or automatically. The manual labeling manner may be that an image of the video frame is manually analyzed to determine whether the interest degree label marked on the video frame is a label of interest or a label of non-interest; the automatic marking manner may be that, during the live broadcasting process, a user feedback parameter (such as a number of gifts or a number of bullet subtitles) are obtained in real time, and if the user feedback parameter exceeds a set threshold within a certain time period, the video frame within the time period is marked as a label of interest. In an embodiment, the time period may be any value from 3 seconds to 5 seconds, and the set threshold may be any value from 100 to 200. Exemplarily, the time period is 3 seconds, the set threshold is 150. During the live broadcasting video, if the number of gifts given by users is 300 between 12'30" and 12'33", the video frames between 12'30" and 12'33" are automatically marked with labels of interest. In this application scenario, when the interest degree label is marked on the video frame, the subjective idea of people is considered. For a live broadcasting video in the food category, a food picture with a bright color in the video is marked with a label of interest, and a food picture with a common color is marked with a label of non-interest; for a live broadcasting video in the competitive game category, a picture of killing in the video is marked with a label of interest, and other pictures are marked with labels of non-interest; for a live broadcasting video in the singing category, a picture of dancing is marked with a label of interest, and other pictures are marked with labels of non-interest. Exemplarily, a total of 1,000 live broadcasting videos in multiple video categories on a live broadcasting platform are searched, 5 video frames are respectively extracted from each of the 1,000 live broadcasting videos and 5,000 video frames are obtained, and then the 5,000 video frames are respectively marked with labels of interest to obtain 5,000 video frame samples.

In step 220, a set deep learning model is trained by using the plurality of video frame samples to obtain the interest frame identification model.

In this embodiment, the set deep learning model is a training model established based on an artificial neural network algorithm. An artificial neural network has a basic structure composed of nonlinear variation units, and neural network parameters may include the number of middle layers, the number of processing units between multiple layers, and a learning coefficient. A process of training the deep learning model may be a process of adjusting neural network parameters. Optimal neural network parameters are obtained through continuous training, and the set deep learning model with the optimal neural network parameters is a model to be finally obtained. In an embodiment, after a plurality of video frame samples are obtained, the plurality of video frame samples are used for training the set deep learning model, and the neural network parameters in the set deep learning model are continuously adjusted, so that the set deep learning model has the capability of accurately identifying video frames meeting the interest degree condition in the input video frames, thereby obtaining the interest frame identification model.

In step 230, a video frame set corresponding to a to-be-processed video is obtained, where each video frame carries a timestamp.

In step 240, all video frames in the video frame set are respectively input into the interest frame identification model to obtain a plurality of to-be-synthesized video frames.

In step 250, according to the timestamp carried by each to-be-synthesized video frame, the plurality of to-be-synthesized video frames is spliced to form a short video corresponding to the to-be-processed video.

In this embodiment, a plurality of video frame samples marked with interest degree labels is used for training the set deep learning model, to obtain the interest frame identification model. The identification accuracy of the interest frame identification model is improved.

Embodiment 3

Figure 3:
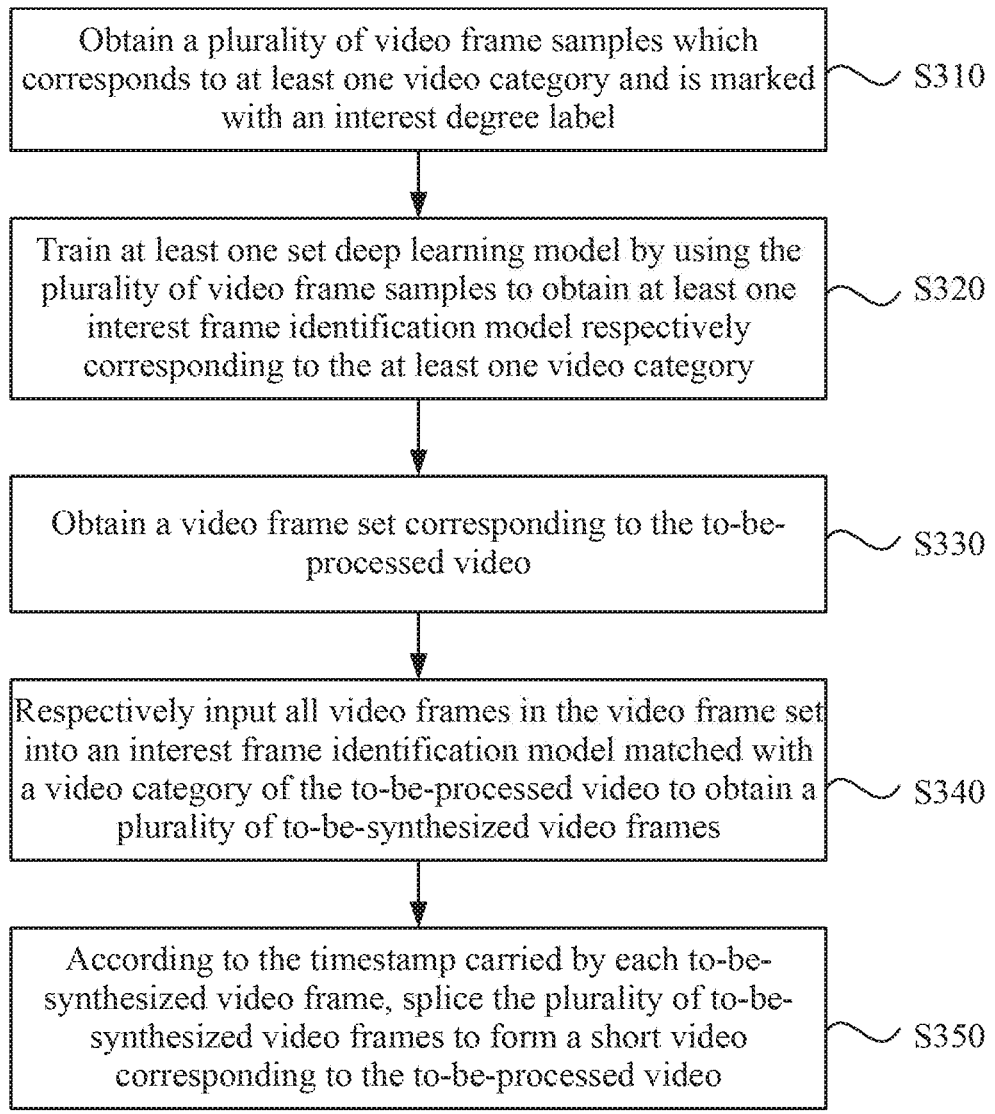
FIG. 3 is a flow chart of a short video synthesis method in embodiment 3 of the present application.

FIG. 3 is a flow chart of a short video synthesis method in embodiment 3 of the present application. Based on the above embodiments, in an embodiment, the step in which all video frames in the video frame set are respectively input into the interest frame identification model to obtain the plurality of to-be-synthesized video frames may be implemented by a step described below. All video frames in the video frame set are respectively input into an interest frame identification model matched with a video category of the to-be-processed video to obtain a plurality of to-be-synthesized video frames. As shown in FIG. 3, the method includes steps described below.

In step 310, a plurality of video frame samples which corresponds to at least one video category and is marked with an interest degree label is obtained.

In this embodiment, a video category may be determined by a theme of a video content included in a live broadcasting video, and may include a food category, a competitive game category, a singing category, a travel category, a beauty makeup category, and the like. In this embodiment, a manner of obtaining the plurality of video frame samples which corresponds to at least one video category and is marked with an interest degree label may be to search for a certain number of live broadcasting videos in multiple video categories on a live broadcasting platform, extract video frames from the found live broadcasting videos, and mark the interest degree labels to the extracted video frames, so as to obtain a plurality of video frame samples corresponding to the video categories. Exemplarily, 2,000 video frames are respectively extracted from videos in each of the food category, the competitive game category, the singing category, the travel category and the beauty makeup category, and then the 2,000 video frames in each video category are marked with interest degree labels to obtain 2,000 video frame samples corresponding to each video category.

In an embodiment, the step in which the plurality of video frame samples which corresponds to at least one video category and is marked with the interest degree label is obtained may be implemented in the following manner: multiple video frame samples marked with interest degree labels are obtained and input into a pre-trained video category determination model, so as to obtain video frame samples corresponding to at least one video category.

In this embodiment, the video category determination model may be used to identify a video category of the input video frame. In this embodiment, after the plurality of video frame samples marked with interest degree labels is obtained, images of the plurality of video frame samples are input into the pre-trained video category determination model to classify the plurality of video frame samples and obtain video frame samples corresponding to the video category. Exemplarily, assuming that 10,000 video frame samples marked with interest degree labels are provided, the 10,000 video frame samples are input into the video category determination model, and the 10,000 video frame samples are classified, thereby obtaining 1,000 video frame samples in the food category, 1,500 video frame samples in the competitive game category, 2,000 video frame samples in the singing category, 3,000 video frame samples in the tour category, and 2,500 video frame samples in the beauty makeup category. The video frame samples marked with the interest degree labels are classified through the pre-trained video category determination model, thereby reducing manual intervention and improving classification efficiency.

In step 320, at least one set deep learning model is trained by using the plurality of video frame samples to obtain at least one interest frame identification model respectively corresponding to the at least one video category.

In an embodiment, after respectively obtaining video frame samples corresponding to at least one video category, the video frame samples corresponding to the at least one video category are used for training the at least one set deep learning model, so that the at least one set deep learning model has the capability of identifying video frames which correspond to the video category and meet the interest degree condition, thereby obtaining at least one interest frame identification model corresponding to the at least one video category. In this embodiment, each video category corresponds to one interest frame identification model, and the interest degree of a video frame in the video category may be identified.

In step 330, a video frame set corresponding to the to-be-processed video is obtained.

In step 340, all video frames in the video frame set are respectively input into an interest frame identification model matched with a video category of the to-be-processed video to obtain a plurality of to-be-synthesized video frames.

In an embodiment, the video category of the to-be-processed video is obtained, and then the video frame set is input into the interest frame identification model matched with the video category of the to-be-processed video, to obtain a plurality of to-be-synthesized video frames. Exemplarily, assuming that the to-be-processed video belongs to the food category, the video frame set of the to-be-processed video is input into an interest frame identification model matched with the food category.

In step 350, according to the timestamp carried by each to-be-synthesized video frame, the plurality of to-be-synthesized video frames is spliced to form a short video corresponding to the to-be-processed video.

In this embodiment, a plurality of video frame samples which correspond to at least one video category and is marked with interest degree labels are obtained, the plurality of video frame samples is used for training at least one set deep learning model, and at least one interest frame identification model which corresponds to the at least one video category is obtained. Each video category has an interest frame identification model matched with the each video category, thereby improving the accuracy of model identification.

Embodiment 4

Figure 4:
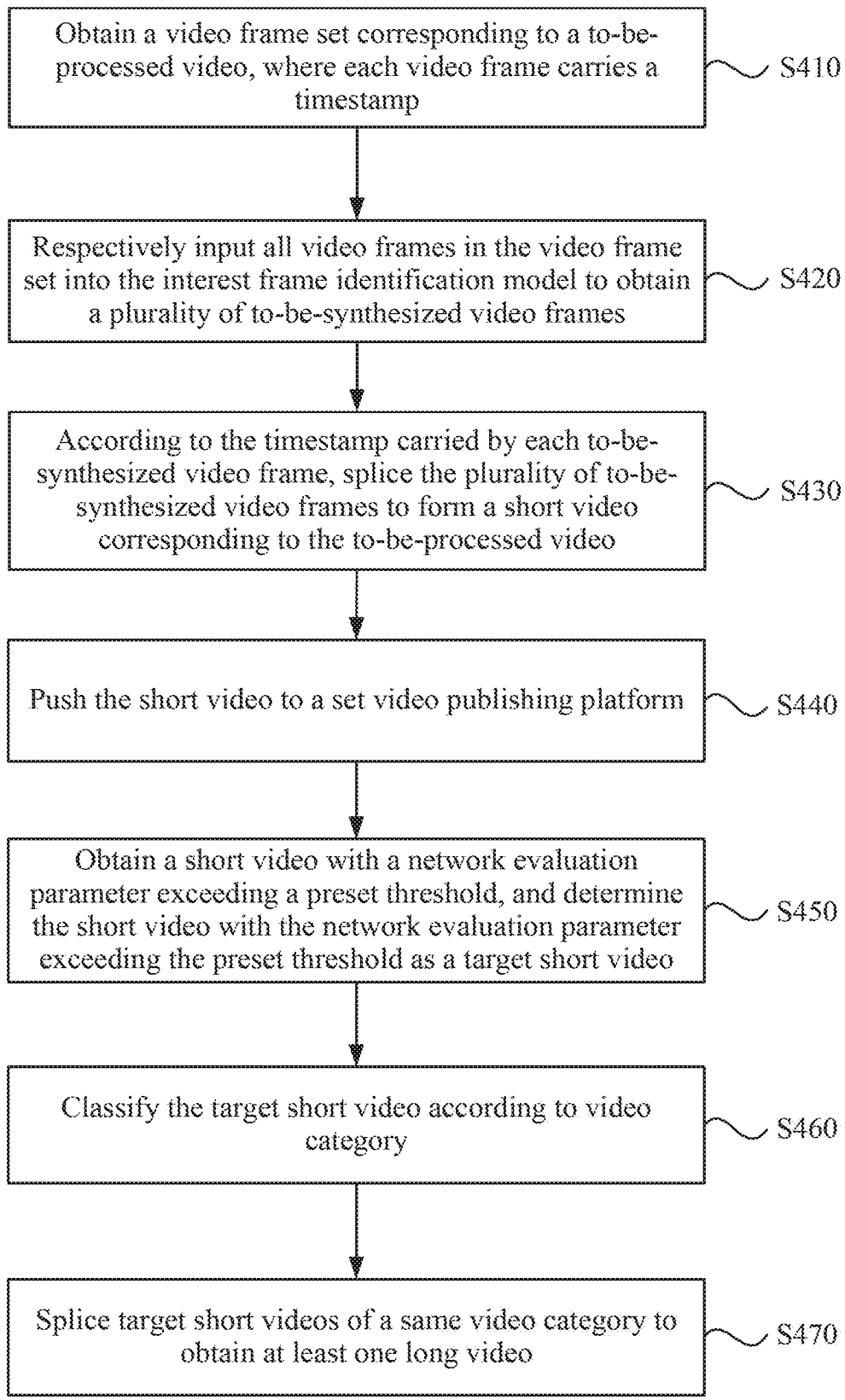
FIG. 4 is a flow chart of a short video synthesis method in embodiment 4 of the present application.

FIG. 4 is a flow chart of a short video synthesis method in embodiment 4 of the present application. Based on the above embodiments, as shown in FIG. 4, the method includes steps described below.

In step 410, a video frame set corresponding to a to-be-processed video is obtained, where each video frame carries a timestamp.

In step 420, all video frames in the video frame set are respectively input into the interest frame identification model to obtain a plurality of to-be-synthesized video frames.

In step 430, according to the timestamp carried by each to-be-synthesized video frame, the plurality of to-be-synthesized video frames is spliced to form a short video corresponding to the to-be-processed video.

In step 440, the short video is pushed to a set video publishing platform.

In an embodiment, the set video publishing platform may be a live broadcasting platform (such as, Huya live broadcasting platform). A manner of pushing a short video to the set video publishing platform may be to start a participation entry (such as account login and the like) of the set video publishing platform, log in to the set video publishing platform through the participation entry, and upload the short video to the set video publishing platform.

In step 450, a short video with a network evaluation parameter exceeding a preset threshold is obtained, and the short video with the network evaluation parameter exceeding the preset threshold is determined as a target short video. The network evaluation parameter includes a video score or a number of video clicks.

If the network evaluation parameter is the video score, the preset threshold may be set to any value from 8 points to 9 points. For example, the preset threshold is set to 9 points. If the network evaluation parameter is the number of video clicks, the preset threshold may be set to any value between ten million and twenty million. For example, the preset threshold is set to twenty million.

In this embodiment, after a short video is pushed to the set video publishing platform, a user may click to watch the short video when browsing a page of the set video publishing platform, or score the short video after watching. A server where the set video publishing platform is located counts user clicks on the short video to form the number of clicks on the short video; or records the user's score on the short video, calculates an average value, and obtains a video score of the short video. When the network evaluation parameter of the short video exceeds the preset threshold, the short video is determined as the target short video.

In step 460, the target short video is classified according to video category.

In this application scenario, since a large number of short videos are displayed on the set video publishing platform, multiple target short videos may be obtained.

In an embodiment, the video category of the target short video is determined according to the playing content in the target short video, and then the target short video is classified according to the video category. Exemplarily, it is assumed that 10 target short videos are obtained, 3 target short videos belonging to the food category, 4 target short videos belonging to the competitive game category, and 3 target short videos belonging to the beauty makeup category.

In step 470, target short videos of a same video category are spliced to obtain at least one long video.

In an embodiment, the target short videos may be spliced in any order, in an order of time durations of short videos from small to large, or the like. Exemplarily, it is assumed that 10 target short videos are obtained, 3 target short videos belonging to the food category, 4 target short videos belonging to the competitive game category, and 3 target short videos belonging to the beauty makeup category. Short videos contained in the food category, in the competitive game category and in the beauty makeup category are spliced respectively to obtain 3 long videos.

In an embodiment, after the at least one long video is obtained, the method further includes a step described below. The at least one long video is pushed to the set video publishing platform.

In an embodiment, a manner of pushing a long video to the set video publishing platform may be to start a participation entry (such as account login) of the set video publishing platform, log in to the set video publishing platform through the participation entry, and upload the long video to the set video publishing platform.

According to the present disclosure, after the short videos are pushed to the set video publishing platform, short videos belonging to a same video category and having the network evaluation parameter exceeding a preset threshold are spliced to obtain at least one long video, and the long video is pushed to the set video publishing platform. Short videos meeting the interest degree condition are spliced and then published, so that exposure degree of the short videos can be improved, and the browsing amount of the video publishing platform can be improved to a certain extent.

Embodiment 5

Figure 5:
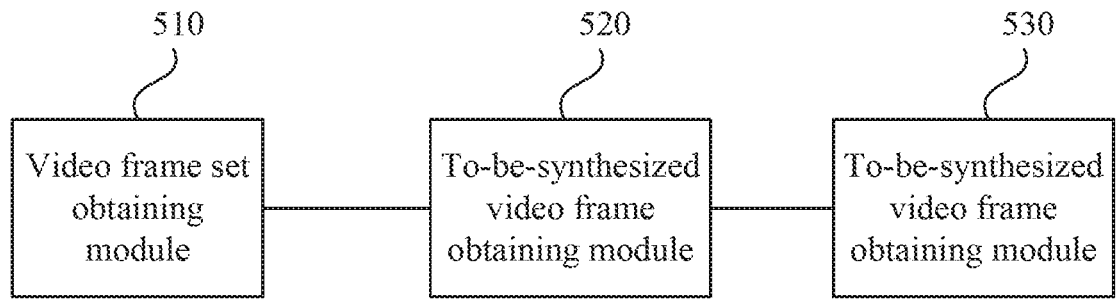
FIG. 5 is a structural diagram of a short video synthesis apparatus in embodiment 5 of the present application.

FIG. 5 is a structural diagram of a short video synthesis apparatus in embodiment 5 of the present application. As shown in FIG. 5, the apparatus includes a video frame set obtaining module 510, a to-be-synthesized video frame obtaining module 520, and a short video forming module 530.

The video frame set obtaining module 510 is configured to obtain a video frame set corresponding to a to-be-processed video, where each video frame in the video frame set carries a timestamp; the to-be-synthesized video frame obtaining module 520 is configured to respectively input all video frames in the video frame set into an interest frame identification model to obtain a plurality of to-be-synthesized video frames, where the interest frame identification model is used for identifying a video frame meeting an interest degree condition in the input video frames; and the short video forming module 530 is configured to splice, according to the timestamp carried by the each to-be-synthesized video frame, the plurality of to-be-synthesized video frames to form a short video corresponding to the to-be-processed video.

In an embodiment, the apparatus further includes a first video frame sample obtaining module and a first interest frame identification model obtaining module. The first video frame sample obtaining module is used for obtaining a plurality of video frame samples marked with interest degree labels; and the first interest frame identification model obtaining module is used for training a set deep learning model by using images of the plurality of video frame samples to obtain an interest frame identification model.

In an embodiment, the apparatus further includes a second video frame sample obtaining module and a second interest frame identification model obtaining module. The second video frame sample obtaining module is used for obtaining a plurality of video frame samples which correspond to at least one video category and are marked with interest degree labels; the second interest frame identification model obtaining module is used for training at least one set deep learning model by using the plurality of video frame samples to obtain at least one interest frame identification model respectively corresponding to at least one video category; the to-be-synthesized video frame obtaining module 520 is configured to: respectively input all video frames in the video frame set into an interest frame identification model matched with the video category of the to-be-processed video to obtain a plurality of to-be-synthesized video frames.

In an embodiment, the interest degree label includes a label of interest and a label of non-interest.

In an embodiment, the second video frame sample obtaining module is further configured to: obtain a plurality of video frame samples marked with interest degree labels and input the plurality of video frame samples into a pre-trained video category determination model to obtain a video frame sample corresponding to at least one video category.

In an embodiment, the apparatus further includes a short video pushing module, a target short video determination module, a classification module and a long video obtaining module. The short video pushing module is used for pushing a short video to a set video publishing platform; the target short video determination module is used for obtaining a short video with a network evaluation parameter exceeding a preset threshold and determining the short video with the network evaluation parameter exceeding the preset threshold as a target short video, where the network evaluation parameter includes a video score or a number of video clicks; the classification module is used for classifying the target short video according to the video category; and the long video obtaining module is used for splicing target short videos of a same video category to obtain at least one long video.

In an embodiment, the apparatus further includes a long video pushing module, which is used for pushing at least one long video to the set video publishing platform.

In an embodiment, the interest frame identification model is obtained by using a plurality of video frame samples marked with interest degree labels to train a set deep learning model.

The above apparatus can execute the method provided by the embodiments of the present application, and has functional modules and beneficial effects corresponding to the execution method. Technology details that not described in detail in the embodiment can refer to the method provided by the embodiments of the present application.

Embodiment 6

Figure 6:
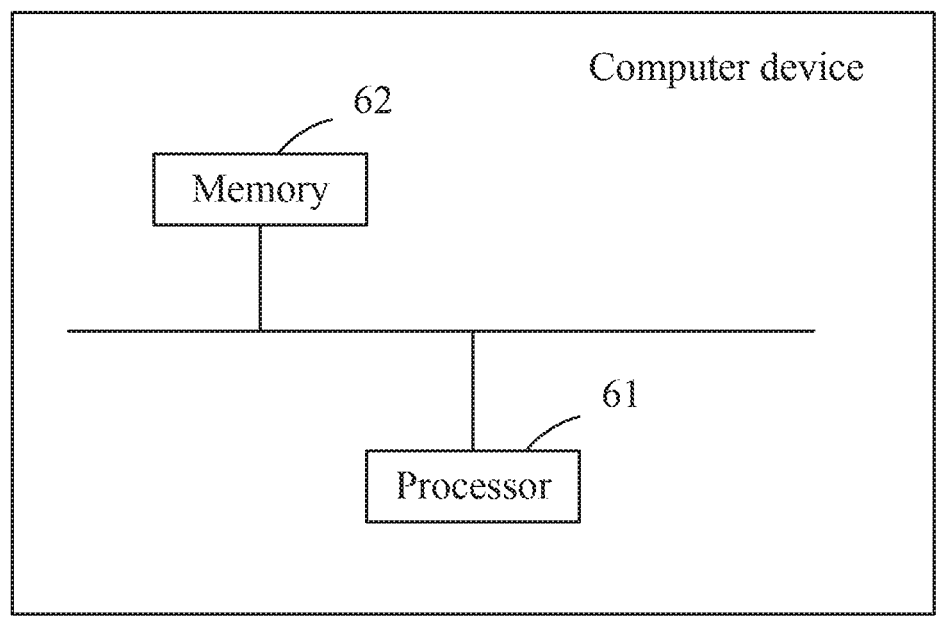
FIG. 6 is a structural diagram of a computer device in embodiment 6 of the present application.

FIG. 6 is a structural diagram of a computer device in embodiment 6 of the present application. As shown in FIG. 6, this embodiment provides a computer device, which includes a processor 61 and a memory 62. A number of processors in the computer device may be one or more, with one processor 61 as an example in FIG. 6. The processor 61 and the memory 62 in the computer device may also be connected via a bus or in other manners, with connection via a bus as an example in FIG. 6.

The processor 61 of the computer device in this embodiment is integrated with the short video synthesis apparatus provided by the above embodiments. In addition, the memory 62 in the computer device, as a computer-readable storage medium, may be used for storing one or more programs, which may be software programs, computer executable programs, and modules, such as program instructions/modules corresponding to the short video synthesis method in the embodiments of the present application. The processor 61 runs the software programs, instructions or modules stored in the memory 62 to execute function applications and data processing of a device, that is, to implement the short video synthesis method in the above method embodiments.

The memory 62 may include a program storage region and a data storage region. The program storage region may store an operating system and an application program required by at least one function; the data storage region may store data created depending on use of a device. Furthermore, the memory 62 may include a high speed random access memory, and may also include a nonvolatile memory such as at least one disk memory, flash memory or another nonvolatile solid state memory. In some examples, the memory 62 may include memories which are remotely disposed relative to the processor 61 and these remote memories may be connected to the terminal via a network. Examples of the above network include, but are not limited to, the Internet, an intranet, a local area network, a mobile communication network and a combination thereof.

The processor 61 operates the program stored in the memory 62 to execute multiple function applications and data processing, to implements the short video synthesis method provided by the embodiments of the present disclosure.

Embodiment 7

An embodiment of the present application provides a computer-readable storage medium. The computer-readable storage medium is configured to store a computer program. When executed by a data backup device, the computer program implements the short video synthesis method provided by the embodiments of the present application.

The computer-readable medium may be a computer-readable signal medium or a computer readable storage medium. The computer-readable storage medium may be, for example, but not limited to, an electronic, magnetic, optical, electromagnetic, infrared, or semiconductor system, apparatus, or device, or any combination of the foregoing. The computer-readable storage medium includes (a non-exhaustive list): an electrical connection having one or more wires, a portable computer disc, a hard disk, a Random Access Memory (RAM), a Read-Only Memory (ROM), an Erasable Programmable Read-Only Memory (EPROM), or a flash Memory, an optical fiber, a Compact Disc Read-Only Memory (CD-ROM), an optical storage device, a magnetic storage device, or any suitable combination of the foregoing. In the present disclosure, the computer-readable storage medium may be any tangible medium that can contain, or store a program. The program may be used by an instruction execution system, apparatus, or means or used in combination therewith.

The computer-readable signal medium may include a propagated data signal in baseband or as part of a carrier wave and carry computer-readable program code. The propagated data signal may use a variety of forms, which include, but are not limited to, an electro-magnetic signal, an optical signal, or any suitable combination thereof. The computer-readable signal medium also may be any computer-readable medium that is not a computer-readable storage medium and that can send, propagate, or transport a program for use by an instruction execution system, apparatus, or means or used in combination therewith.

Program code embodied on the computer-readable medium may be transmitted using any appropriate medium, including but not limited to wireless, wire line, optical fiber cable, Radio Frequency (RF), etc., or any suitable combination of the foregoing.

Computer program code for performing the operations of the present disclosure may be written in one or more programming languages, or in a combination thereof. The programming languages include an object oriented programming language such as Java, Smalltalk, C ++, and also conventional procedural programming language, such as the "C" programming language or a similar programming language. The program code can be executed entirely on a user's computer, partly on the user's computer, as an independent software package, partly on the user's computer and partly on a remote computer, or entirely on a remote computer or a server. In cases involving the remote computer, the remote computer may be connected to the user's computer through any type of network, including a LAN or a wide area network (WAN), or may be connected to an external computer (such as, using an Internet service provider to connect through the Internet).

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A short video synthesis method, comprising:
    obtaining a video frame set corresponding to a to-be-processed video, wherein each video frame in the video frame set carries a timestamp;
    respectively inputting all video frames in the video frame set into an interest frame identification model to obtain a plurality of to-be-synthesized video frames, wherein the interest frame identification model is used for identifying a video frame meeting an interest degree condition in the input video frames; and
    splicing, according to the timestamp carried by the each to-be-synthesized video frame, the plurality of to-be-synthesized video frames to form a short video corresponding to the to-be-processed video;
    wherein the interest frame identification model is obtained through training a set deep learning model by using a plurality of video frame samples marked with an interest label.

2. The method of claim 1, wherein before respectively inputting all video frames in the video frame set into the interest frame identification model to obtain the plurality of to-be-synthesized video frames, the method further comprises:
    obtaining a plurality of video frame samples marked with an interest degree label; and
    training a set deep learning model by using images of the plurality of video frame samples to obtain the interest frame identification model.

3. The method of claim 2, wherein the interest degree label comprises: a label of interest, and a label of non-interest.

4. The method of claim 1, wherein before respectively inputting all video frames in the video frame set into the interest frame identification model to obtain the plurality of to-be-synthesized video frames, the method further comprises:
    obtaining a plurality of video frame samples which corresponds to at least one video category and is marked with an interest degree label; and
    training at least one set deep learning model by using the plurality of video frame samples to obtain at least one interest frame identification model respectively corresponding to the at least one video category;
    wherein respectively inputting all video frames in the video frame set into the interest frame identification model to obtain the plurality of to-be-synthesized video frames, comprising:
    respectively inputting all video frames in the video frame set into an interest frame identification model matched with a video category of the to-be-processed video to obtain a plurality of to-be-synthesized video frames.

5. The method of claim 4, wherein obtaining the plurality of video frame samples which corresponds to at least one video category and is marked with the interest degree label comprises:
    obtaining a plurality of video frame samples marked with the interest degree label; and inputting the plurality of video frame samples into a pre-trained video category determination model to obtain a video frame sample corresponding to at least one video category.

6. The method of claim 4, wherein the interest degree label comprises: a label of interest, and a label of non-interest.

7. The method of claim 1, wherein after the short video is obtained, the method further comprises:
pushing the short video to a set video publishing platform;
obtaining a short video with a network evaluation parameter exceeding a preset threshold, and determining the short video with the network evaluation parameter exceeding the preset threshold as a target short video, wherein the network evaluation parameter comprises a video score or a number of video clicks;
classifying the target short video according to video categories; and
splicing target short videos of a same video category to obtain at least one long video.

8. The method of claim 7, wherein after the at least one long video is obtained, the method further comprises:
pushing the at least one long video to the set video publishing platform.

9. A non-transitory computer-readable storage medium, configured to store a computer program, wherein, when executed by a processor, the computer program implements the method of claim 1.

10. A short video synthesis apparatus, comprising:
a video frame set obtaining module, configured to obtain a video frame set corresponding to a to-be-processed video, wherein each video frame in the video frame set carries a timestamp;
a to-be-synthesized video frame obtaining module, configured to respectively input all video frames in the video frame set into an interest frame identification model to obtain a plurality of to-be-synthesized video frames, wherein the interest frame identification model is used for identifying a video frame meeting an interest degree condition in the input video frames; and
a short video forming module, configured to splice, according to the timestamp carried by the each to-be-synthesized video frame, the plurality of to-be-synthesized video frames to form a short video corresponding to the to-be-processed video;
wherein the interest frame identification model is obtained through training a set deep learning model by using a plurality of video frame samples marked with an interest label.

11. A computer device, comprising a memory, a processor, and a computer program stored in the memory and executable on the processor, wherein, when executing the computer program, the processor is configured to:
obtain a video frame set corresponding to a to-be-processed video, wherein each video frame in the video frame set carries a timestamp;
respectively input all video frames in the video frame set into an interest frame identification model to obtain a plurality of to-be-synthesized video frames, wherein the interest frame identification model is used for identifying a video frame meeting an interest degree condition in the input video frames; and
splice, according to the timestamp carried by the each to-be-synthesized video frame, the plurality of to-be-synthesized video frames to form a short video corresponding to the to-be-processed video;
wherein the interest frame identification model is obtained through training a set deep learning model by using a plurality of video frame samples marked with an interest label.

12. The computer device of claim 11, wherein before respectively inputting all video frames in the video frame set into the interest frame identification model to obtain the plurality of to-be-synthesized video frames, the processor is further configured to:
obtain a plurality of video frame samples marked with an interest degree label; and
train a set deep learning model by using images of the plurality of video frame samples to obtain the interest frame identification model.

13. The computer device of claim 12, wherein the interest degree label comprises: a label of interest, and a label of non-interest.

14. The computer device of claim 11, wherein before respectively inputting all video frames in the video frame set into the interest frame identification model to obtain the plurality of to-be-synthesized video frames, the processor is further configured to:
obtain a plurality of video frame samples which corresponds to at least one video category and is marked with an interest degree label; and
train at least one set deep learning model by using the plurality of video frame samples to obtain at least one interest frame identification model respectively corresponding to the at least one video category;
wherein when respectively inputting all video frames in the video frame set into the interest frame identification model to obtain the plurality of to-be-synthesized video frames, the processor is configured to:
respectively input all video frames in the video frame set into an interest frame identification model matched with a video category of the to-be-processed video to obtain a plurality of to-be-synthesized video frames.

15. The computer device of claim 14, wherein the interest degree label comprises: a label of interest, and a label of non-interest.

16. The computer device of claim 14, wherein when obtaining the plurality of video frame samples which corresponds to at least one video category and is marked with the interest degree label, the processor is configured to:
obtain a plurality of video frame samples marked with the interest degree label; and
input the plurality of video frame samples into a pre-trained video category determination model to obtain a video frame sample corresponding to at least one video category.

17. The computer device of claim 11, wherein after the short video is obtained, the processor is further configured to:
push the short video to a set video publishing platform;
obtain a short video with a network evaluation parameter exceeding a preset threshold, and determine the short video with the network evaluation parameter exceeding the preset threshold as a target short video, wherein the network evaluation parameter comprises a video score or a number of video clicks;
classify the target short video according to video categories; and
splice target short videos of a same video category to obtain at least one long video.

18. The computer device of claim 17, wherein after the at least one long video is obtained, the processor is further configured to:

push the at least one long video to the set video publishing platform.

\* \* \* \* \*